United States Patent
Kyo

(10) Patent No.: US 7,509,634 B2
(45) Date of Patent: Mar. 24, 2009

(54) SIMD INSTRUCTION SEQUENCE GENERATING PROGRAM, SIMD INSTRUCTION SEQUENCE GENERATING METHOD AND APPARATUS

(75) Inventor: Shorin Kyo, Tokyo (JP)

(73) Assignee: NEC Corporation, Tokyo (JP)

( * ) Notice: Subject to any disclaimer, the term of this patent is extended or adjusted under 35 U.S.C. 154(b) by 819 days.

(21) Appl. No.: 10/704,718

(22) Filed: Nov. 12, 2003

(65) Prior Publication Data

US 2004/0098709 A1    May 20, 2004

(30) Foreign Application Priority Data

Nov. 12, 2002    (JP)    ............................. 2002-327873

(51) Int. Cl.
G06F 9/45    (2006.01)
(52) U.S. Cl. ........................ 717/161; 717/140; 717/149; 716/11
(58) Field of Classification Search ................. 717/161, 717/152, 153, 149, 140; 716/11
See application file for complete search history.

(56) References Cited

U.S. PATENT DOCUMENTS

| | | | | |
|---|---|---|---|---|
| 5,121,498 A | * | 6/1992 | Gilbert et al. ................ | 717/149 |
| 5,210,836 A | * | 5/1993 | Childers et al. .............. | 712/241 |
| 5,381,534 A | * | 1/1995 | Shi ............................ | 709/203 |
| 5,579,273 A | * | 11/1996 | Childers et al. .............. | 365/205 |
| 5,671,187 A | * | 9/1997 | Childers et al. .............. | 365/205 |
| 5,694,588 A | * | 12/1997 | Ohara et al. ................. | 712/225 |
| 5,986,913 A | * | 11/1999 | Childers et al. ............... | 365/51 |
| 6,047,366 A | * | 4/2000 | Ohara et al. .................. | 712/14 |
| 6,113,650 A | * | 9/2000 | Sakai .......................... | 717/160 |
| 6,373,898 B1 | * | 4/2002 | Langer et al. ........... | 375/240.23 |
| 6,453,459 B1 | * | 9/2002 | Brodersen et al. ........... | 717/100 |
| 6,487,715 B1 | * | 11/2002 | Chamdani et al. ........... | 717/154 |
| 6,732,354 B2 | * | 5/2004 | Ebeling et al. .............. | 717/119 |
| 6,842,124 B2 | * | 1/2005 | Penna ......................... | 341/67 |
| 6,966,056 B2 | * | 11/2005 | Kawaguchi ................. | 717/152 |
| 7,039,906 B1 | * | 5/2006 | Trelewicz et al. ........... | 717/149 |
| 7,075,462 B2 | * | 7/2006 | Sudharsanan ................ | 341/67 |
| 7,200,836 B2 | * | 4/2007 | Brodersen et al. ........... | 717/100 |

FOREIGN PATENT DOCUMENTS

| | | |
|---|---|---|
| JP | 9-160784 A | 6/1997 |
| JP | 10-228382 A | 8/1998 |
| JP | 11-316688 A | 11/1999 |
| JP | 2001-282549 A | 10/2001 |

OTHER PUBLICATIONS

Parallel Supercomputing in SIMD Architectures, written by R. Michael Hord and published 1990, pp. 39-84.*

(Continued)

Primary Examiner—Lewis A Bullock, Jr.
Assistant Examiner—Jason Mitchell
(74) Attorney, Agent, or Firm—Sughrue Mion, PLLC

(57) ABSTRACT

A translator receives a source code that is described using a process designation (such as a line-by-line process designation, a line data extraction designation, and a broadcast designation) to be performed on line data of an image on a line by line basis, parses and optimizes the source code, and then generates an SIMD macro code that is an intermediate form taking into consideration the use of an SIMD instruction set. A simplifier generates, from the SIMD macro code, a simplified SIMD macro code, namely, a composite macro code into which a series of codes having the relationship between the definition and the reference of the same virtual SIMD register is organized. A machine code generator generates, from the simplified SIMD macro code, a machine code that efficiently uses an SIMD instruction.

14 Claims, 11 Drawing Sheets

OTHER PUBLICATIONS

Template Software Foundation Template. Using the SNAP Language, Chapter 7, 1997.*

Performance of a Software MPEG Video Decoder, Ketan Patel et al, ACM, Sep. 1993, 8 pages.*

Systemic Address and Control Code Transformations for Performance Optimization of MPEG-4 Video Decoder, M. Palkovic et al, ACM, Mar 2002, 6 pages.*

A SIMD For Real-Time MPEG Video Encoding and Decoding, IEEE, 1997, pp. 119-128.*

MPEG-4 Industry Forum MPEG-4 The Media Standard, Nov. 19, 2002, 30 pages.*

Sholin Kyo et al., An Ultra High Speed Image Processing System Development Environment Based on a Primary Processor Array, Journal of the Information Processing Society of Japan, Jun. 15, 1998, pp. 1790-1800, vol. 39 No. 6, Information Processing Society of Japan.

Junji Sakai et al., SIMD Command Generation Technique for Multimedia, Research Reports of the Information Processing Society of Japan, Mar. 27, 1996, pp. 7-12, vol. 96 No. 33, Information Processing Society of Japan, Japan.

Office Action dated Dec. 2, 2008 issued in Japanese Patent Application 2002-327873.

* cited by examiner

```
1) int tst(src,dst,lines)
2)    sep unsigned char src[];   /* in: grey image */
3)    sep unsigned char dst[];   /* out: grey image /
4)    unsigned short lines;  /* number of lines to work on */
5) {
6)    short i;
7)
8)    sep unsigned char _asub(separate unsigned char a, separate unsigned char b);
9)    sep unsigned char p1, p4;
10)   sep unsigned char pp;
11)
12)   for ( i=1 ; i<lines-1 ; i++ ){
13)      p1 = src[i-1];
14)      p4 = src[i+1];
15)      pp = _asub(p1,p4);
16)      dst[i] = (sep unsigned char)(>pp + :<pp + (pp<<1));
17)   }
18)
19)   dst[0]=dst[lines-1]=lines;
20)   return src[2]:[3:];
21) }
```

FIG. 2

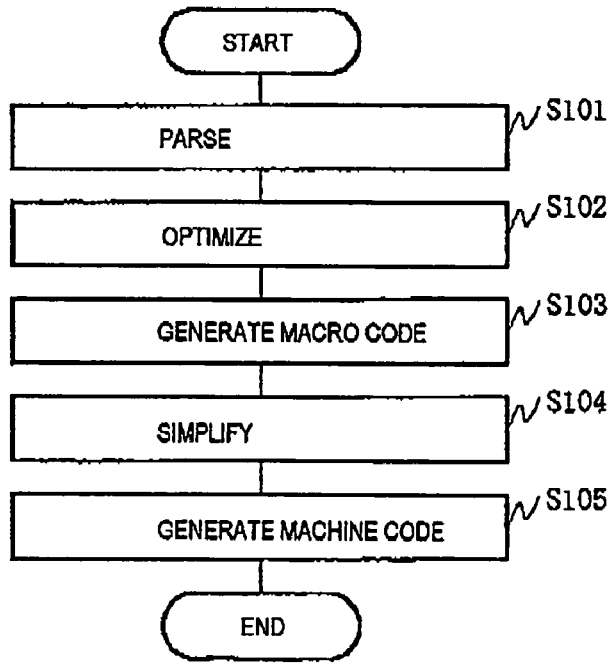

FIG. 3

```
( 1) line 12
( 2) _i =(short) 1
( 3) T2 =(unsigned short) cast(short) 1
( 4) T33 =(unsigned short) _3 - 1
( 5) T3 =(unsigned short) T33
( 6) if ( T2 >=(unsigned short) T3 ) goto 3
( 7) label 4
( 8) line 13
( 9) t2 =(short) _i - 1
(10) t3 =(long) cast(short) t2
(11) t4 =(sep unsigned char*) _1 + t3
(12) t5 =(sep unsigned char) *t4
(13) _p1 =(sep unsigned char) t5
(14) line 14
(15) t6 =(short) _i + 1
(16) t7 =(long) cast(short) t6
(17) t8 =(sep unsigned char*) _1 + t7
(18) t9 =(sep unsigned char) *t8
(19) _p4 =(sep unsigned char) t9
(20) line 15
(21) t10 =(sep unsigned char) asub(_p1,_p4)
(22) _pp =(sep unsigned char) t10
(23) line 16
(24) t11 =(sep unsigned char) _pp >> 1
(25) t12 =(sep short) cast(sep unsigned char) t11
(26) t13 =(sep unsigned char) _pp :< 1
(27) t14 =(sep short) cast(sep unsigned char) t13
(28) t15 =(sep short) t12 + t14
(29) t16 =(sep short) cast(sep unsigned char) _pp
(30) t17 =(sep short) t16 + t16
(31) t18 =(sep short) t15 + t17
(32) t19 =(sep unsigned char) cast(sep short) t18
(33) t20 =(long) cast(short) _i
(34) t21 =(sep unsigned char*) _2 + t20
(35) *t21 ?=(sep unsigned char) t19
(36) _i =(short) t6
(37) T2 =(unsigned short) cast(short) _i
(38) T3 =(unsigned short) T33
(39) if ( T2 <(unsigned short) T3 ) goto 4
(40) label 3
(41) line 19
(42) t22 =(sep unsigned char) cast(unsigned short) _3
(43) t24 =(long) cast(unsigned short) T33
(44) t25 =(sep unsigned char*) _2 + t24
(45) *t25 ?=(sep unsigned char) t22
(46) *_2 ?=(sep unsigned char) t22
(47) line 20
(48) t27 =(sep unsigned char*) _1 + 2
(49) t28 =(sep unsigned char) *t27
(50) t29 =(unsigned char) t28 :[(sep unsigned char) 3
(51) t30 =(short) cast(unsigned char) t29
(52) return(short) t30
```

FIG. 4

```
//*** INTERMEDIATE CODE : (1) ~ (7)
1) M_LD_D_U_2 esp,28,eax //eax = _3[0]
2) M_SUB_U_2 eax,1,edx
3) M_ST_D_U_2 esp,2,edx // _33[0] = edx
4) M_ST_D_U_2 esp,0,1 // _i[0] = 1
5) M_CMP_U_2 1,edx
6) M_BR_GE_U_2 UL1_3
7) M_BLOCK1 (1)
L1_4:
//*** INTERMEDIATE CODE : (8) ~ (13)
8) M_LD_D_U_2 esp,0,eax //eax = _i[0]
9) M_SUB_U_2 eax,1,edx
10) M_CAST_U_2S_U_4 edx,ecx
11) M_LD_D_U_4 esp,20,edx //edx = _1[0]
12) M_MUL_U_4 ecx,256,ecx
13) M_ADD_U_4 edx,ecx,ecx
14) M_LD_I_M_1A ecx,0,rb0
//*** INTERMEDIATE CODE : (14) ~ (21)
15) M_ADD_U_2 eax,1,ecx
16) M_CAST_U_2S_U_4 ecx,ebx
17) M_MUL_U_4 ebx,256,ebx
18) M_ADD_U_4 edx,ebx,ebx
19) M_LD_I_M_1A ebx,0,rb1
20) M_ASUB_M_1 rb0,rb1,rb1
//*** INTERMEDIATE CODE : (22) ~ (35)
21) M_PE_RIGHT_M_1 rb1,1,rb15
22) M_CAST_M_1U_M_2 rb15,r0
23) M_PE_LEFT_M_1 rb1,1,rb14

24) M_CAST_M_1U_M_2 rb14,r1
25) M_ADD_M_2 r0,r1,r1       ──► 25-1) M_CONT_2X_CASTLD_1U rb14|X_ADD_2 r0|X_ST_2A r1

26) M_CAST_M_1U_M_2 rb1,r0
27) M_ADD_M_2 r0,r0,r2
28) M_ADD_M_2 r1,r2,r0
29) M_CAST_M_2S_M_1 r0,rb0
30) M_CAST_U_2S_U_4 eax,edx
31) M_LD_D_U_4 esp,24,eax //eax = _2[0]
32) M_MUL_U_4 edx,256,edx
33) M_ADD_U_4 eax,edx,edx
34) M_ST_I_M_1T edx,0,rb0

└─► 34-1) M_CONT_2X_CASTLD_1U rb1|X_SHL_2 1|X_ADD_2 r1|X_CASTST_1S_T [edx:0]
//*** INTERMEDIATE CODE : (36) ~ (40)
35) M_ST_D_U_2 esp,0,ecx // _i[0] = ecx
36) M_LD_D_U_2 esp,2,eax //eax = _33[0]
37) M_CMP_U_2 ecx,eax
38) M_BR_LT_U_2 UL1_4
39) M_BLOCK2 (0)
L1_3:
//*** INTERMEDIATE CODE : (41) ~ (46)
40) M_LD_D_U_2 esp,28,eax //eax = _3[0]
41) M_CAST_U_2U_M_1 eax,rb0
42) M_LD_D_U_2 esp,2,eax //eax = _33[0]
43) M_CAST_U_2U_U_4 eax,edx
44) M_LD_D_U_4 esp,24,eax //eax = _2[0]
45) M_MUL_U_4 edx,256,edx
46) M_ADD_U_4 eax,edx,edx
47) M_ST_I_M_1T edx,0,rb0
48) M_ST_I_M_1T eax,0,rb0
//*** INTERMEDIATE CODE : (47) ~ (51)
49) M_LD_D_U_4 esp,20,eax //eax = _1[0]
50) M_ADD_U_4 eax,312,edx
51) M_LD_I_M_1A edx,0,rb0
52) M_BROADCAST_BGN_2 3
53) M_BROADCAST_U_1 rb0,3,eax
54) M_BROADCAST_END
55) M_CAST_U_1U_U_2 eax,edx
//*** INTERMEDIATE CODE : (52)
56) M_COPY_U edx,eax
57) M_LD_D_U_4 esp,4,ebx
58) M_ADDP_D esp,12,esp
59) M_LD_D_U_4 esp,0,ebp
60) M_ADDP_D esp,4,esp
61) M_RET
```

FIG. 6

```
xor eax, eax
xor ecx, ecx
xor ebx, ebx

LABEL_CONT_0:
  pxor xmm7, xmm7
  movdqa xmm0, XMMWORD PTR [rb14+eax]
  movdqa xmm1, XMMWORD PTR [rb14+eax]
  movdqa xmm2, XMMWORD PTR [rb14+eax+16]
  movdqa xmm3, XMMWORD PTR [rb14+eax+16]

punpcklbw xmm0, xmm7
  punpckhbw xmm1, xmm7
  punpcklbw xmm2, xmm7
  punpckhbw xmm3, xmm7 paddw xmm0, XMMWORD PTR [r0+ecx]
  paddw xmm1, XMMWORD PTR [r0+ecx+16]
  paddw xmm2, XMMWORD PTR [r0+ecx+32]
  paddw xmm3, XMMWORD PTR [r0+ecx+48]

movdqa XMMWORD PTR [r1+ecx], xmm0
  movdqa XMMWORD PTR [r1+ecx+16], xmm1
  movdqa XMMWORD PTR [r1+ecx+32], xmm2
  movdqa XMMWORD PTR [r1+ecx+48], xmm3 add eax, 32
  add ecx, 64
  add ebx, 64
  cmp ebx, 256
  jl LABEL_CONT_0
```

FIG. 8

```
mov DWORD PTR [_TmpS+12], edx
xor eax, eax
xor ecx, ecx
xor ebx, ebx
xor edx, edx LABEL_CONT_1:
    pxor xmm7, xmm7
    movdqa xmm0, XMMWORD PTR [rb1+eax]
    movdqa xmm1, XMMWORD PTR [rb1+eax]

punpcklbw xmm0, xmm7
    punpckhbw xmm1, xmm7 psllw xmm0, 1
    psllw xmm1, 1 paddw xmm0, XMMWORD PTR [r1+ecx]
    paddw xmm1, XMMWORD PTR [r1+ecx+16]

mov edi, DWORD PTR [_TmpS+12]
    add edi, edx
    pand xmm0, XMMWORD PTR [_lmask]
    pand xmm1, XMMWORD PTR [_lmask]
    packuswb xmm0, xmm1
    movdqa xmm4, XMMWORD PTR [mr+edx]
    maskmovdqu xmm0, xmm4
    add edi, 16 add eax, 16
    add ecx, 32
    add edx, 16
    add ebx, 32
    cmp ebx, 256
    jl LABEL_CONT_1
```

FIG. 9

```
mov esi, rb1
mov edi, rb14
add esi, 1
mov ecx, 3

PE_LABEL_1:
    movq mm0, [esi]
    movq mm1, [esi+8]
    movq mm2, [esi+16]
    movq mm3, [esi+24]
    movq mm4, [esi+32]
    movq mm5, [esi+40]
    movq mm6, [esi+48]
    movq mm7, [esi+56]
    movq [edi], mm0
    movq [edi+8], mm1
    movq [edi+16], mm2
    movq [edi+24], mm3
    movq [edi+32], mm4
    movq [edi+40], mm5
    movq [edi+48], mm6
    movq [edi+56], mm7
    add esi, 64
    add edi, 64
    dec ecx
    jnz PE_LABEL_1 movq mm0, [esi]
    movq mm1, [esi+8]
    movq mm2, [esi+16]
    movq mm3, [esi+24]
    movq mm4, [esi+32]
    movq mm5, [esi+40]
    movq mm6, [esi+48]
    movq [edi], mm0
    movq [edi+8], mm1
    movq [edi+16], mm2
    movq [edi+24], mm3
    movq [edi+32], mm4
    movq [edi+40], mm5
    movq [edi+48], mm6 mov eax, DWORD PTR [esi+56]
    mov DWORD PTR [edi+56], eax
    mov ax, WORD PTR [esi+60]
    mov WORD PTR [edi+60], ax
    mov al, BYTE PTR [esi+62]
    mov BYTE PTR [edi+62], al mov esi, rb1
    mov al, BYTE PTR [esi+0]
    mov BYTE PTR [edi+63], al
```

FIG. 10

| -1 | -2 | -1 |
|---|---|---|
|  |  |  |
| 1 | 2 | 1 |

FIG. 13

SIMD INSTRUCTION SEQUENCE GENERATING PROGRAM, SIMD INSTRUCTION SEQUENCE GENERATING METHOD AND APPARATUS

BACKGROUND OF THE INVENTION

1. Field of the Invention

The present invention relates to a method, an apparatus, and a computer program for generating an SIMD instruction sequence, intended for use with a computer having an extended instruction set called a single instruction multi data (SIMD) instruction for high-speed multimedia processing.

2. Description of the Related Art

In the processing of multi-media data such as images, the same type of operation is typically repeated to data in a fixed format. Some of currently available computers provide an instruction called SIMD instruction to enhance data processing performance and thus perform the same type of operation on a vast amount of data in response to a single instruction.

Data format and instruction set handled by the SIMD are different from computer architecture to computer architecture. Generally, computers process data of 64 bits or 128 bits in bulk in response to a single instruction. A plurality of pieces of data, such as 8-bit, 16-bit, or 32-bit integer type data, or floating-point 32-bit data or 64-bit floating-point data, are packed into this data width, and is then concurrently processed in response to a single instruction. For example, since 16 pieces of 8-bit integer type data are packed into 128 bits, an image processing software program processes data of 16 pixels at a time. The use of the SIMD instruction is particularly effective for high-speed processing of images. Instructions handled by the SIMD include addition, subtraction, multiplication, and division operations, logical operations such as AND gating and OR gating, mask operation, saturate calculation, multiply and accumulation, inner product operation, maximum/minimum value calculation, absolute value calculation, and mean value calculation, etc.

Typical SIMD instruction sets may be MMX technology and streaming SIMD instruction in the Pentium® architecture, 3Dnow! in AMD K6/K7, AltiVec in the PowerPC architecture, MDMX in the MIPS processor, and VIS in the SPARC architecture.

A processor instruction sequence containing an SIMD instruction must be generated to efficiently develop a program intended for use in a computer having an SIMD instruction set. Japanese Unexamined Patent Publication (JP-A) No. 10-228382 discloses a compiler (for SIMD) for generating a target program. An SIMD type loop structure is extracted from a source program in which processes of a plurality of data elements are successively described. The SIMD type loop structure is then converted to the one using an SIMD instruction, and the data elements are processed using an SIMD instruction set The target program is thus produced.

The compiler disclosed in JP-A No. 10-228382 automatically generates a target program intended for use in a computer having an SIMD set from a sequential processing program described using a high-level language such as C language. A technique for analyzing the sequential processing program to automatically extract an SIMD eligible portion from the program is still immature, and is subject to limitations. A sequential processing program containing a complicated process such as an image filtering process is not sufficiently SIMD enabled even if the program is subjected to an SIMD enabling compiler. A target program efficiency utilizing the SIMD instruction set is not generated. The generation of the target program using the SIMD instruction set depends on a manual operation using an assembler language.

The manual operation using the assembler language requires a high degree of skill and is time consuming. It is likely that an error is introduced into the instruction sequence. In a method of manually generating an assembly designation, processors of different types (for example, Pentium® II, III, and 4 of Intel and K-6, K-7 of AMD, etc.) use different SIMD (for example MMX, SSE, 3Dnow, etc.). Each time the target processor is changed, another assembly must be prepared.

SUMMARY OF THE INVENTION

Accordingly, it is an object of the present invention to provide a method and an apparatus for generating an SIMD instruction processing sequence for efficient image processing from an image process designation in a high-level language.

To achieve the above object, the SIMD instruction sequence generation method of the present invention includes generating automatically an SIMD instruction sequence from a source code that is described using a process designation that is to be performed on line data of an image on a line by line basis. More specifically, line data is P data elements present in consecutive addresses with the head address thereof aligned to the powers of 2. In a line-by-line calculation designation, the same unary operation is performed on all data elements of one line data, or the same binary operation is performed on all corresponding data element pairs of line data of two lines. In a line-by-line adjacent element reference designation, referencing an element which is separated to the right or to the left by a designated number of elements from each of all data elements of the line data is designated. The line-by-line calculation designation and the line-by-line adjacent element reference designation are collectively referenced as a line-by-line process designation. A designation for referencing a particular data element of the line data is referred to as a line data extraction designation. A designation for substituting scalar data as particular single data for all data elements of the line data is referred to as a broadcast designation. A designation for processing conventional scalar data is referred to as a scalar process designation. A combination of the four designations, namely, the line-by-line process designation, the line data extraction designation, the broadcast designation, and the scalar process designation is referred to as a line-by-line operation designation. A work register that processes an SIMD instruction is referred to as an SIMD register. In accordance with the present invention, a source code is described using the line-by-line operation designation. An SIMD instruction sequence generation method and an SIMD instruction sequence generation apparatus performs a compile process to automatically generate an SIMD instruction sequence using an SIMD instruction set of a target machine.

The compile process generates an instruction sequence A that operates as instructed in a conventional manner in response to the scalar process designation contained in the line-by-line operation designation, and generates an SIMD instruction sequence B in response to the line-by-line process designation contained in the line-by-line operation designation. The SIMD instruction sequence B designates a loop operation, wherein the loop operation is repeated by $P/(S \times M)$ cycles, and includes, in the body thereof, M SIMD load instructions for loading, in M SIMD registers, $S \times M$ data elements from among P data elements of the line date to be processed present in consecutive addresses in a memory with a head address thereof aligned to the powers of 2, SIMD operation instructions of the number required for the M SIMD registers, and M SIMD write instructions for writing, in the memory area having consecutive addresses with the head address aligned to the powers of 2, the content of the M SIMD registers having data obtained as a result of the SIMD operation instructions. Here, P is the number of pixels horizontally across an image to be processed, S is a value smaller than P and is the number of data elements that are simultaneously processed in response to a single SIMD instruction, and M is an integer equal to or larger than 1 and equal to or smaller than the number of SIMD registers of a target machine.

In response to the line data extraction designation contained in the line-by-line operation designation, an instruction sequence C for designating an operation to reference data defined in th SIMD instruction sequence B within the instruction sequence A is generated. In response to the broadcast designation, an instruction sequence D for designating an operation to reference data defined in the instruction sequence A within the instruction sequence B is generated.

In accordance with the present invention, the SIMD instruction sequence is generated from the source code that is described using the process designation that is performed on line data of an image on a line by line basis. The process designation specifically includes the line-by-line process designation, the line data extraction designation, and the broadcast designation. A user thus generates a target program that efficiently uses the SIMD instruction set, by simply generating the source code that explicitly pointing to an SIMD enabling portion using the line-by-line process designation, the line data extraction designation, and the broadcast designation.

BRIEF DESCRIPTION OF THE DRAWING

FIG. 2 illustrates one example of a source code using a line-by-line operation designation in accordance with the preferred embodiment of the present invention;

FIG. 3 is a flowchart illustrating the flow of the general process of a compiler in accordance with the preferred embodiment of the present invention;

FIG. 4 illustrates an intermediate language code output by an optimizer in accordance with the preferred embodiment of the present invention;

FIG. 6 illustrates SIMD macro codes and simplified SIMD macro codes in accordance with the preferred embodiment of the present invention;

FIG. 8 illustrates part of an SIMD instruction sequence code generated in accordance with the preferred embodiment of the present invention;

FIG. 9 illustrates part of the SIMD instruction sequence generated in accordance with the preferred embodiment of the present invention;

FIG. 10 illustrates part of the SIMD instruction sequence code generated in accordance with the preferred embodiment of the present invention;

FIG. 13 illustrates vertical symmetry of kernel coefficients for use in image filtering process.

DESCRIPTION OF THE PREFERRED EMBODIMENTS

The preferred embodiments of the present invention are discussed with reference to the drawings.

Figure 1:
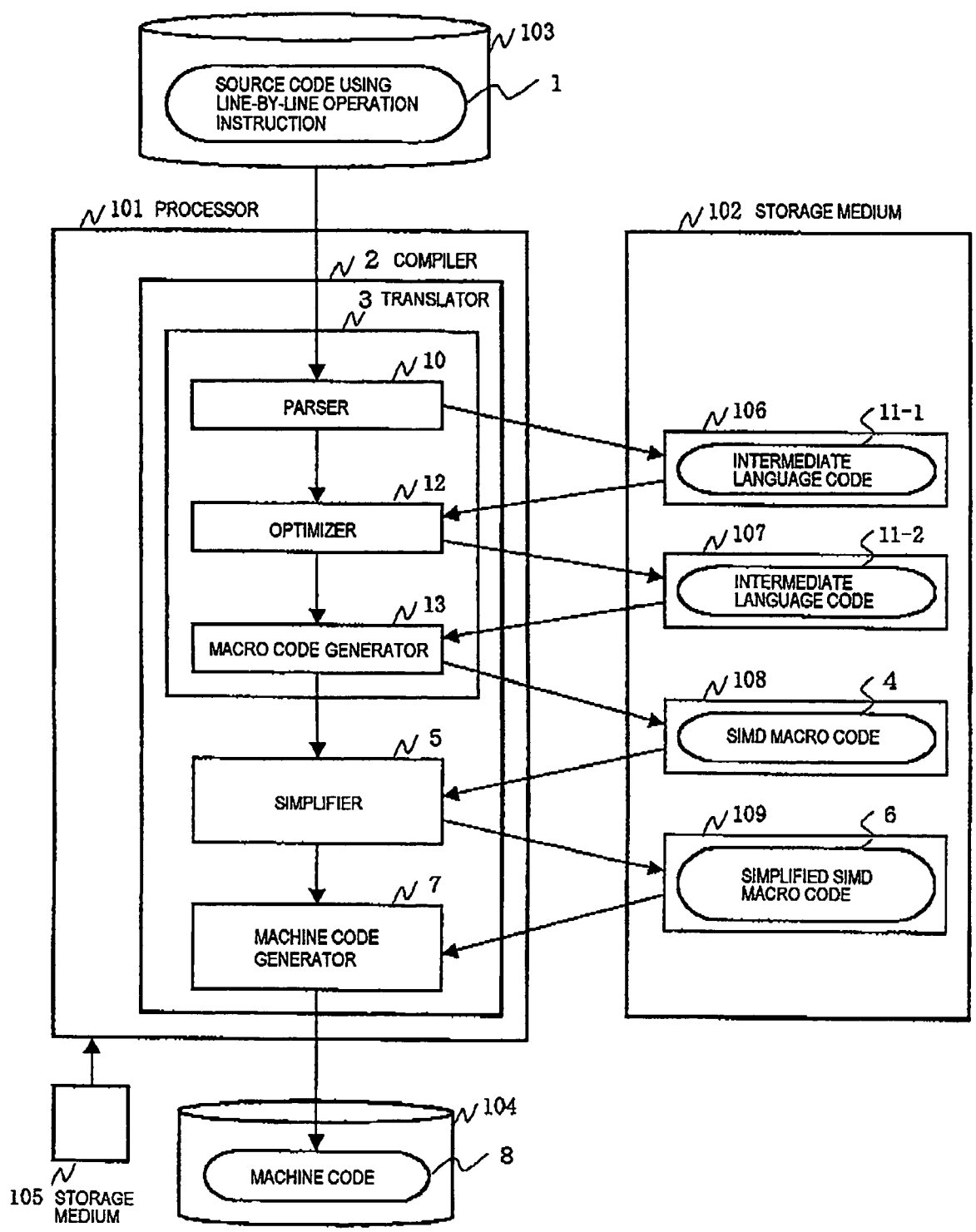
FIG. 1 is a block diagram illustrating the entire structure of a computer that executes an SIMD instruction sequence generation method for image processing in accordance with one preferred embodiment of the present invention.

FIG. 1 is a block diagram illustrating the entire structure of a computer that executes an SIMD instruction sequence generation method for image processing in accordance with one preferred embodiment of the present invention. As shown, the computer includes a processor 101 that operates under the control of a program, a storage device 102 including a main memory and an auxiliary memory, each connected to the processor 101, a storage device 103, a storage device 104, and a storage device 105.

The storage device 103 stores a source code 1. The source code 1 is described using a language, which is a general-purpose high-level programming language such as the C language with the specifications thereof partially extended so that a process designation to be performed on line data of an image on a line by line basis is contained. Here, the line data means P data elements present in consecutive addresses with a head address thereof aligned to the powers of 2. Added process designations include mainly three process designations such as a line-by-line process designation, a line data extraction designation, and a broadcast designation. The line-by-line process designation is further divided into two, namely, a line-by-line calculation designation and a line-by-line adjacent element reference designation.

The line-by-line calculation designation designates the same unary operation to be performed on all data elements of one line data, or the same binary operation to be performed on all corresponding data element pairs of the line data of two lines. The line-by-line adjacent element reference designation designates the referencing of an element which is separated to the right or to the left by a designated number of elements from each of all data elements of the line data. The line data extraction designation designates the referencing of a particular data element of the line data. The broadcast designation designates the substituting of scalar data as particular single data for all data elements of the line data. A scalar process destination designates processing scalar data. A combination of the four designations, namely, the line-by-line process designation, the line data extraction designation, the broadcast designation, and the scalar process designation is referred to as a line-by-line operation designation. The source code 1 is described using the line-by-line operation designation.

FIG. 2 illustrates a description of a filtering process typically used in image processing, wherein the source code 1 uses a line-by-line operation designation. The source code 1 shown in FIG. 2 uses a syntax in which a key word sep that declares whether or not the data is line data is added to the conventional C language. Pointers src and dst at line 1 to line 3 pointing to the head of the line data array for storing storing a source image and a resulting image, respectively, are declared as an argument of a function tst. At line 4, lines are an unsigned short scalar value (of 2 bytes) representing the number lines to be processed, and are thus provided as a third argument of the function tst. Line 6 declares 2 byte integer type variable i, line 8 declares an argument and a return value of a function_asub determining the absolute value of a difference, and lines 9 and 10 declare variables p1, p4 and pp, each of which is unsigned 1 byte character type data. For example, lines 12 through 17 designate a loop of a for statement as in the conventional syntax of the C language. The loop body designates a calculation using src, which is an array of line data, and p1 and p4 as line data. For example, line 13 designates an operation to substitute (i−1)-th line data of an array src for p1, line 14 designates an operation to substitute (i+1)-th line data of the array src for p4, and line 15 designates an operation to call a function_asub having line data as a return value based on the two pieces of line data p1 and p4 as arguments, and to store the resulting value in the line data variable pp.

Line 16 shown in FIG. 2 uses the line-by-line adjacent element reference designation and the line-by-line calculation designation. In line 16, one form of the line-by-line adjacent element reference designation is :> and :<. For example, :>PP and :<PP respectively means the referencing of, with respect to each of all data elements of a line data variable PP, one data element separated from a data element of interest to the left by one data element and a data element separated from the data element of interest to the right by one data element To reference one data element separated from a data element of interest by one element only, the designated number of elements is 1, and is omitted. To reference one data element separated by two or more elements, the designated number of elements indicating how many elements the data element to reference is separated from the element of interest must be specified. Also, + of :>PP+:<PP, + of :<PP+(PP<<1), and <<(shifting operation) designate line-by-line calculation operations. Here, addition and shifting operation are quoted, but the operations designated by the line-by-line calculation designation are not limited to the addition and the shifting operation.

Line 19 describes the broadcast designation, and means the operation of an end processing in which the values of the lines are substituted for all data elements in the zero line and (lines-1)th line of the line data array dst.

Line 20 describes the line data extraction designation, and designates the referencing of a third data element at a second line of the line data array src having the source image held therewithin. Line 20 also designates the use of the result of the referencing as a parameter of a return statement.

Returning to FIG. 1, the storage device 105 is a computer readable storage medium such as a CD-ROM or a magnetic disk, and records an SIMD instruction sequence generating program. The SIMD instruction sequence generating program recorded in the storage device 105 is read by the processor 101. The processor 101 operates under the control of the SIMD instruction sequence generating program, thereby producing a compiler 2 therewithin.

The compiler 2 receives the source code 1, using the line-by-line operation designation, from the storage device 103, and automatically generates an SIMD instruction sequence using the SIMD instruction set held by a target machine. The compiler 2 generally performs the following process in response to the line-by-line operation designation contained in the source code 1.

The compiler 2 generates an instruction sequence A for performing an operation in response to a scalar process designation contained in the source code 1 as in a process designation in the conventional art.

The compiler 2 organize the line data to be processed, in response to the line-by-line process designation contained in the source code 1, and generates an SIMD instruction sequence B. The SIMD instruction sequence B designates a loop operation, wherein the loop operation is repeated by P/(S×M) cycles, and includes, in the body thereof, M SIMD load instructions for loading, in M SIMD registers, S×M data elements from among P data elements of the line date to be processed present in consecutive addresses in a memory with a head address thereof aligned to the powers of 2, SIMD operation instructions of the number required for the M SIMD registers, and M SIMD write instructions for writing, in the memory area having consecutive addresses with the head address thereof aligned to the powers of 2, the content of the M SIMD registers having data obtained as a result of the SIMD operation instructions. The SIMD register is a work register that is used in response to an SIMD instruction. Here, P is the number of pixels horizontally across an image to be processed, S is a value smaller than P and is the number of data elements that are simultaneously processed in response to a single SIMD instruction, and M is an integer equal to or larger than 1 and equal to or smaller than the number of SIMD registers of a target machine. The reason why the SIMD instruction sequence is generated in response to the line-by-line process designation is described below. A single SIMD instruction processes S data elements, and the S data elements are stored in a single SIMD register. Since a loop body uses M SIMD registers, S×M data elements are processed in one cycle. By looping P/(S×M) cycles, the processing of all data elements is completed, because the number of all data elements is P.

The compiler 2 also generates, in response to the line data extraction designation contained in the source code 1, an instruction sequence C for designating an operation to reference data, defined in the SIMD instruction sequence B, within the instruction sequence A, and generates, in response to the broadcast designation, an instruction sequence D for designating an operation to reference data, defined in the instruction sequence A, within the instruction sequence B.

The structure and operation of the compiler 2 are now discussed in detail below.

The compiler 2 receives the source code 1 from the storage device 103, finally converts the source code 1 to a machine code 8 that is a target program having the SIMD instruction sequence, and then outputs the machine code 8 to the storage device 104. The compiler 2 includes a translator 3, a simplifier 5, and a machine code generator 7. Upon receiving the source code 1 from the storage device 103, the translator 3 converts the source code 1 to an SIMD macro code 4 in an intermediate form for SIMD instruction sequence generation, and outputs the SIMD macro code 4 to a memory 108 of the storage device 102. Upon receiving the SIMD macro code 4 from the memory 108, the simplifier 5 optimizes the SIMD macro code 4 to generate a simplified SIMD macro code 6 that is an optimized SIMD macro code, and then outputs the simplified SIMD macro code 6 to a memory 109 of the storage device 102. Upon receiving the simplified SIMD macro code 6 from the memory 109, the machine code generator 7 converts the simplified SIMD macro code 6 to a machine code 8 that is a target program, and then outputs the machine code 8 to the storage device 104.

The translator 3 includes a parser 10, an optimizer 12, and a macro code generator 13. In response to the source code 1 input from the storage device 103, the parser 10 parses the source code 1, converts the source code 1 to an intermediate language code 11-1, and outputs the intermediate language code 11-1 to a memory 106 of the storage device 102. The optimizer 12 optimizes the intermediate language code 11-1 input from the memory 106 using known optimization techniques such as constant propagation, copy propagation, strength reduction, and common subexpression elimination, and outputs an optimized intermediate language code 11-2 to a memory 107 of the storage device 102. Upon receiving the optimized intermediate language code 11-2 from the memory 107, the macro code generator 13 converts the optimized intermediate language code 11-2 to the SIMD macro code 4 in the intermediate form taking into consideration the use of the SIMD instruction set, and then outputs the SIMD macro code 4 to the memory 108.

FIG. 3 is a flowchart illustrating the flow of the general process of the compiler 2 in accordance with the preferred embodiment of the present invention. The operation of the compiler 2 is now described with reference to FIG. 3.

In the compiler 2, the parser 10 of the translator 3 parses the source code 1 input from the storage device 103, generates the intermediate language code 11-1 and stores the intermediate language code 11-1 in the memory 106 (step S101). The optimizer 12 receives the intermediate language code 11-1 from the memory 106, optimizes the intermediate language code 11-1 using known optimization techniques such as constant propagation, copy propagation, strength reduction, and common sub-expression elimination, and stores the optimized intermediate language code 11-2 in the memory 107 (step S102).

FIG. 4 illustrates the intermediate language code 11-2 that is generated by the optimizer 12 in the translator 3 in response to the input of the source code 1 shown in FIG. 2. Each code in the intermediate language code 11-2 is hereinafter simply referred to as an intermediate code. As shown in FIG. 4, an intermediate code starting with line at line 1, serves a debugging purpose to indicate the approximate line position in the source code 1 shown in FIG. 2 against which a subsequent intermediate code is generated. An intermediate code starting with label at line 7 points to a jump address. T<number> and t<number> appearing at lines 3 and 9, respectively, are symbols representing temporary variables, _<number n> appearing at line 17 is a symbol representing an n-th argument of a function, and _<identifier> appearing at line 2 is a symbol representing a user variable <identifier>. A key word sep declaring whether data is line data is used in intermediate codes as in the source code 1. The intermediate code with sep attached thereto is the one corresponding to one of the line-by-line process designation, the line data extraction designation, and the broadcast designation. An intermediate code without sep becomes a scalar process designation. The form (:>PP and :<PP) for the line-by-line adjacent element reference designation used in the source code 1 is also used as is. For example, lines 24 and 27, associated with sep in the form of the line-by-line adjacent element reference designation, is an intermediate code corresponding to the line-by-line adjacent element reference designation. Lines 11 and 12, associated with sep, and having operators on the right-hand side, are intermediate codes corresponding to the line-by-line calculation designation. Line 42, associated with sep, and having data as line data, is an intermediate code corresponding to the broadcast designation. Line 50, associated with sep, and referencing line data, is, an intermediate code corresponding to the line data extraction designation.

Figure 5:
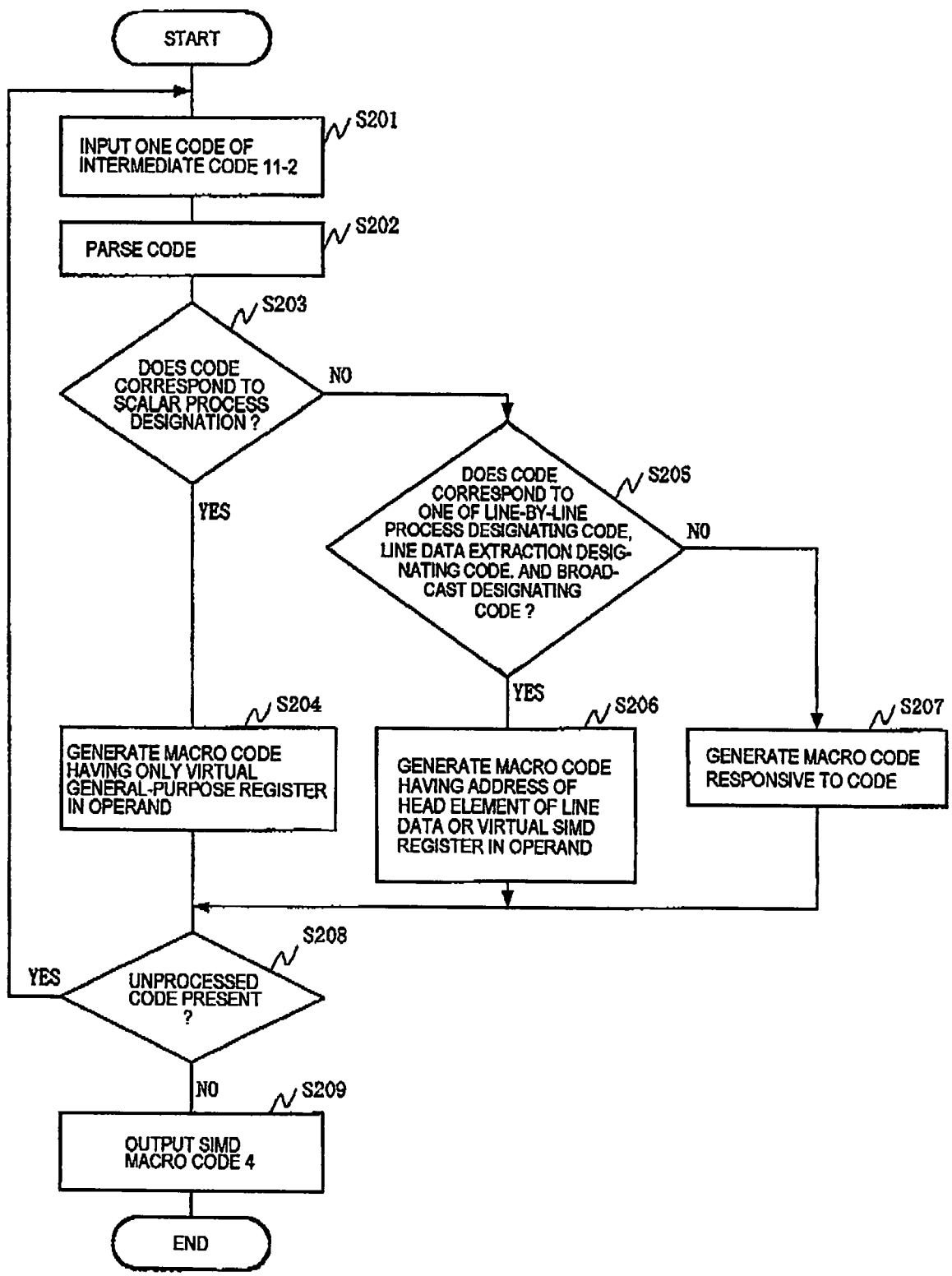
FIG. 5 is a flowchart illustrating the process of a macro code generator in accordance with the preferred embodiment of the present invention.

The macro code generator 13 in the compiler 2 receives the intermediate language code 11-2 from the memory 107, and generates the SIMD macro code 4, and then stores the SIMD macro code 4 in the memory 108 (step S103). FIG. 5 is a flowchart illustrating the process of the macro code generator 13. The macro code generator 13 receives a single intermediate code of the intermediate language code 11-1 (step S201), and analyzes the intermediate code (step S202). If it is determined that the intermediate code corresponds to the scalar process designation (yes in step S203), the macro code generator 13 generates a macro code having a virtual general-purpose register only in an operand corresponding to a general-purpose register of a target machine (step S204). If it is determined that the intermediate code corresponds to one of the line-by-line process designation, the line data extraction designation, and the broadcast designation (yes in step S205), the macro code generator 13 generates a macro code that has, in the operand thereof, a virtual SIMD register that stores all P data elements in addresses of the line data with the head address thereof aligned to the powers of 2 or in consecutive addresses with the head address thereof aligned in a memory (step S206). If the intermediate code is another code corresponding to the debugging or jump address (no in step S205), the macro code generator 13 generates a macro code corresponding thereto (step S207). If an unprocessed code remains in the intermediate language code 11-2 subsequent to the processing of one intermediate code (yes in step S208), the algorithm returns to step S201 to perform the above-referenced process to the unprocessed code. If all intermediate codes in the intermediate language code 11-2 are processed (no in step S208), a series of macro codes generated in steps S204, S206, and S207 are output to the memory 108 as the SIMD macro code 4 (step S209), and the process ends.

One example of the SIMD macro code 4 the macro code generator 13 generates in response to the input of the intermediate language code 11-2 shown in FIG. 4 is shown in line 1 through line 61 in FIG. 6. Each code within the SIMD macro code 4 is hereinafter simply referred to as a macro code. As shown in FIG. 6, a line beginning with //* is a comment line that indicates approximate lines of the intermediate language code 11-2 shown in FIG. 4 which a line subsequent to the line beginning with //* is generated against. The manner of reading the macro code is described below.

The name of a macro code begins with M_, followed by 1) 1-2 fields representing the type of operation of the macro code (such as the type of calculation), 2) 1-2 fields representing whether source data is signed or unsigned, whether to perform a line-by-line calculation (the macro code contains a character string of _M_ if the macro code contains an operation to the line data), and the number of bytes to be processed, 3) 1-2 fields representing whether resulting data is signed or unsigned, and the number of bytes of the resulting data, and 4) information relating to the register (an identifier beginning with r represents a virtual SIMD register, and an identifier beginning with e represents a virtual general-purpose register).

Since a common field M_ representing a macro code is followed by CAST in the macro code of M_CAST_M_1U_M_2 rb14, r1, the type of calculation is a cast operation. A subsequent filed M_1U means information relating to cast source data, wherein M represents that data is line-by-line data, 1 means that the size of the data is 1 byte, and U represents unsigned data. A succeeding M_2 is information relating the cast result, wherein M represents that data is line-by-line data, 2 means that the size of the data is 2 bytes, and no definition about sign means that the sign remains unchanged from that of the source data. Then, rb14 means a source register, with r representing a virtual SIMD register. r1 means a register storing results with r also representing a virtual SIMD register. The macro code at line 24 designates an operation to convert the content of the one-byte virtual SIMD register rb14 to the content of two-byte virtual SIMD register r1. M_ADD_M2 r0, r0, r2 at line 27 means that 2 byte line-by-line data r0 and r0 are added, and that the addition result is stored in r2. Each of macro codes of M_PE_RIGHT_M_1 at line 21, and M_PE_LEFT_M_1 at line 23 is generated in accordance with the line-by-line adjacent element reference designation at line 16 shown in FIG. 2, and the intermediate codes at lines 24 and 26 shown in FIG. 4. Similarly, macro codes at lines 47 and 48 designate an operation to load, to all data elements of a virtual SIMD register of a third operand, scalar data present in an address that results from adding an address represented by a virtual general-purpose register in a first operand to an offset indicated by a second operand. In other words, the macro codes are generated in response to the broadcast designation of the line-by-line operation designation at line 19 shown in FIG. 2, or the intermediate code at line 42 shown in FIG. 4. Macro codes at lines 51-54 are generated in response to the line data extraction designation at line 20 shown in FIG. 2, or in response to the intermediate codes at lines 48-50 shown in FIG. 4, thereby designating the corresponding operations. Specifiers specifying other types of calculation shown in FIG. 6 are listed below.

SUB Subtraction
MUL Multiplication
LD_D Read data from data memory
LD_I Read data from image memory
ST_D Store data to data memory
ST_I Store data to image memory
BROADCAST_* Data broadcast related macro code
COPY Copy data
CMP Compare data (subtract and set flag)
BR_GE Branch if flag shows that an immediately prior CMP result is greater or equal
PE_LEFT Reference data to the immediately left
PE_RIGHT Reference data to the immediately right Returning to FIG. 3, in succession to step S103, the simplifier 5 in the compiler 2 analyzes the relationship of the virtual SIMD register between the definition and reference thereof with respect to all codes having the virtual SIMD register in the operand thereof in the input SIMD macro code 4, and converts a series of codes having the relationship between the definition and reference with respect to the same virtual SIMD register into a single composite code as much as possible. The simplifier 5 reduces the number of definitions and references with reference to the virtual SIMD register present in the memory as much as possible, thereby generating a simplified SIMD macro code 6 having reduced redundancy (step S104).

For example, when the SIMD macro code 4 at lines 1 through 61 shown in FIG. 6 are input, the simplifier 5 replaces the macro codes at lines 24 and 25 with a composite macro code beginning with a name of M_CONT indicated at line 25-1. The macro codes described at lines 26 through 29 and line 34 are replaced with a composite macro code beginning with a name of M_CONT appearing at line 34-1.

The macro codes at lines 24 and 25 are replaced with the composite macro code beginning with the name of M_CONT indicated at line 25-1 because of the following reason. Line 24 designates an operation to sum data in the one-byte virtual register rb14 and data in the two-byte virtual register r1 and to store the sum in the register r1. Line 25 designates an operation to sum data in the two-byte virtual register r0 and data generated in the two-byte register at line 24, and to store the sum in the register r1. If codes are generated directly from lines 24 and 25, a resulting code stores the process result at line 24 in r1. In accordance with line 25-1, the conversion result from rb14 is not stored in r1, but is instead added to r0. The result is stored in r1. Read access and write access to the virtual register are memory access after all, and typically several tens of times slower in speed than access to the SIMD access. With this simplification process, a macro expression with the number of read and write accesses to the virtual register reduced is achieved.

The macro codes described at lines 26 through 29 and line 34 are replaced with the composite macro code at line 34-1 because of the following reason. A number of memory references and memory write operations are performed in the macro codes at lines 26-29 and line 34 as follows:

a) r0<-(cast)tb1
b) r2<-r0+r0
c) r0<-r1+r2
d) rb0<-(cast)r0
e) mem(edx)<-rb0

The macro code at line 34-1 designates an operation for reducing the number of memory references and memory write operations by condensing the macro codes at lines 26-29 and line 34 into a macro code mem(edx)<-(rb1, after being cast, is doubled, and added to r1, and the result is re-cast).

Figure 7:
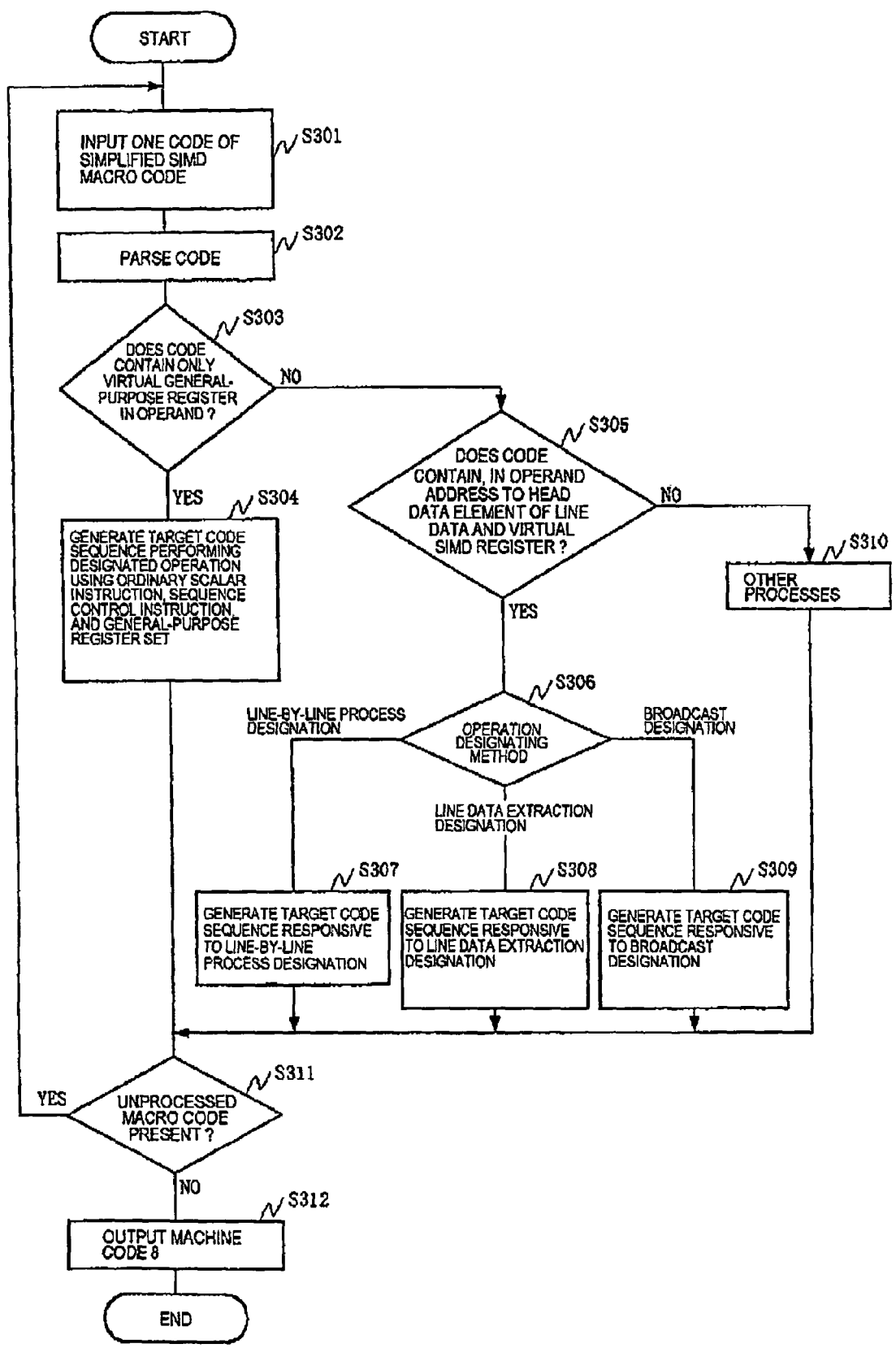
FIG. 7 is a flowchart illustrating the process of a machine code generator in accordance with the preferred embodiment of the present invention.

Referring to FIG. 3, the machine code generator 7 in the compiler 2 converts the simplified SIMD macro code 6 into the machine code 8, and outputs the machine code 8 to the storage device 104 (step S105). FIG. 7 is a flowchart illustrating the process of the machine code generator 7. The machine code generator 7 receives a single code of the simplified SIMD macro code 6 (step S301), and analyzes the code (step S302). If the macro code contains a virtual general-purpose register in the operand thereof (yes in step S303), the machine code generator 7 generates a target code sequence that performs a designated operation using an ordinary scalar instruction, a sequence control instruction and a general-purpose register set of a target machine (step S304). If the macro code contains an address to the head data element of the line data or a virtual SIMD register in the operand thereof (yes in step S305), the operation designation method is determined (step S306). The algorithm proceeds to one of steps S307, S308, and S309 in response to the determination result. If the macro code is another code such as for a debugging purpose (no in step S305), a corresponding process is performed (step S310).

In step S307, a target code sequence corresponding to the macro code with the operation designation method set to the line-by-line process designation is generated. More specifically, the target code sequence for designating a loop operation is generated. The loop operation is repeated by P/(S×M) cycles, and includes, in the loop body thereof, M SIMD load instructions for loading, in M SIMD registers, S×M data elements (M is an integer equal to or larger than 1 and equal to or smaller than the number of SIMD registers of a target machine) from among P data elements starting at a head address of the designated line data or P data elements as the content of the virtual SIMD register, SIMD operation instructions for the M SIMD registers, and M SIMD write instructions for writing, in the designated virtual SIMD register or in a memory area having consecutive addresses starting with the head address of the line data, the content of the M SIMD registers having data obtained as a result of the SIMD operation instructions.

In step S308, a target code sequence corresponding to the macro code with the operation designation method set to the line data extraction designation is generated. More specifically, the target code sequence designates an operation to write, in a physical general-purpose register corresponding to a separately designated virtual register or at a location of a memory, a data element at a designated location, from among P data elements starting with a head address of the designated line data or P data elements in the virtual SIMD register.

In step S309, a target code sequence corresponding to the macro code with the operation designation method set to the broadcast designation is generated. More specifically, the target code sequence designates an operation to write, scalar data at a real general-purpose register corresponding to a separately designated virtual register or at a location of a memory, to P data element areas present in consecutive address areas on a memory, starting with a head address of the designated line data or corresponding to the virtual SIMD register.

If unprocessed macro code remains in the simplified SIMD macro code 6 after the completion of one macro code (yes in step S311), the algorithm returns to step S301 to start processing the unprocessed macro code. When all macro codes in the simplified SIMD macro code 6 are processed (no in step S311), a series of target code sequences generated in steps S304, and S307-S309 are output to the storage device 104 as the machine code 8 (step S312). The process ends.

FIGS. 8-10 show an example of the machine code 8 generated by the machine code generator 7. In this example, the Intel's Pentium® processor 4 is used as a target machine with the simplified SIMD macro code 6 of FIG. 6 input. The number of pixels horizontally across an image to be processed is 256. When MMX/SSE, which is one of SIMD instructions of the Pentium 4 processor, is used, the number of data elements, S, a single SIMD instruction can handle is 8, and M is 8 When SSE2, which is one of the SIMD instructions of the Pentium 4 processor, is used, S is 16, and M is 4. FIG. 8 shows an example of the machine code generated in response to the composite macro code at line 25-1 of FIG. 6, and FIG. 9 shows an example of the machine code generated in response to the composite macro code at line 34-1 of FIG. 6. FIG. 10 shows an example of the machine code generated in response to the macro code M_PE_LE_FT_M__1 at line 23 of FIG. 6.

Referring to FIG. 8, four types of instructions of SSE2, namely, movdqa, punpcklbw, punpckhbw, and paddw are used to designate the composite macro code at line 25-1 of FIG. 6. After being cast to 2 bytes, the content of a one-byte virtual SIMD register is added to the content of another two-byte virtual SIMD register, and the result of the addition is set to the virtual SIMD register. On one cycle, 32 data elements are processed, and eight cycles process 256 data elements. In other words, the data elements of a line are achieved in the single SIMD register.

Referring to FIG. 9, five types of instructions of the SSE2 instructions, namely, movdqa, punpcklbw, punpckhbw, psllw and paddw are used to designate the composite macro code at line 34-1 of FIG. 6. After being cast to 2 bytes, the content of a one-byte virtual SIMD register is shifted leftward by 1 bit. The shifted content is added to the content of another two-byte virtual SIMD register, and the result of the addition is written on an area of a memory where the body of line data is present. This cycle processes 16 data elements. By repeating the cycle 16 times, resulting 256 data elements are written on an area of the memory where the body of the line data is present Unlike the example of the machine code of FIG. 8, the machine code of FIG. 9 includes a special code to achieve a write operation on the memory. During a write-back operation, special line data designated with mr is referenced. If a data element in mr corresponding to each data element is zero, the write-back operation is not performed. If it is necessary to designate whether or not to perform the write-back operation of each data element of the line data, the special line data designated with rm may be defined, and the code shown here is then generated.

Figure 11:
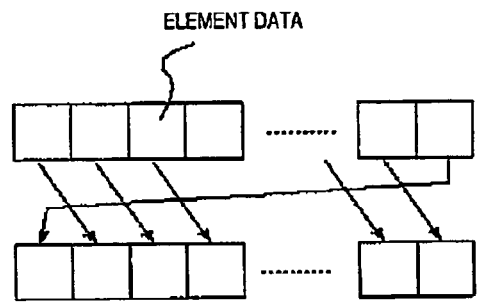
FIG. 11 illustrates the operation of M_PE_LEFT_M_1, which is one of the SIMD macro codes in accordance with the preferred embodiment of the present invention.

FIG. 10 shows a code to reference a data element on the left-hand side of the line data pp designated by :>PP of the line-by-line adjacent element reference designation at line 16 of FIG. 2. The movq of the MMX instruction is mainly used to leftward rotate the entire content of a one-byte virtual SIMD register by one data element, wherein the content is designated by the macro code having the name of M_PE_LEFT_M__1 at line 23 of FIG. 6. In the rotation of the data elements as shown in FIG. 11, last one data element only is shifted to a discontinued address. To achieve the shifting, a code to move 192 data elements is generated in which a process of shifting 8×8 data elements to destination addresses per cycle is repeated by 3 times. A code to move 8×7 data elements is then generated. A code to move 7 data elements out of the 8 data elements remaining in a single SIMD register is generated. A code to move last data element to a discontinued address is then generated. In this way, the operation designated by the macro code M_PE_LEFT_M__1 at line 23 of FIG. 6 is performed.

Figure 12:
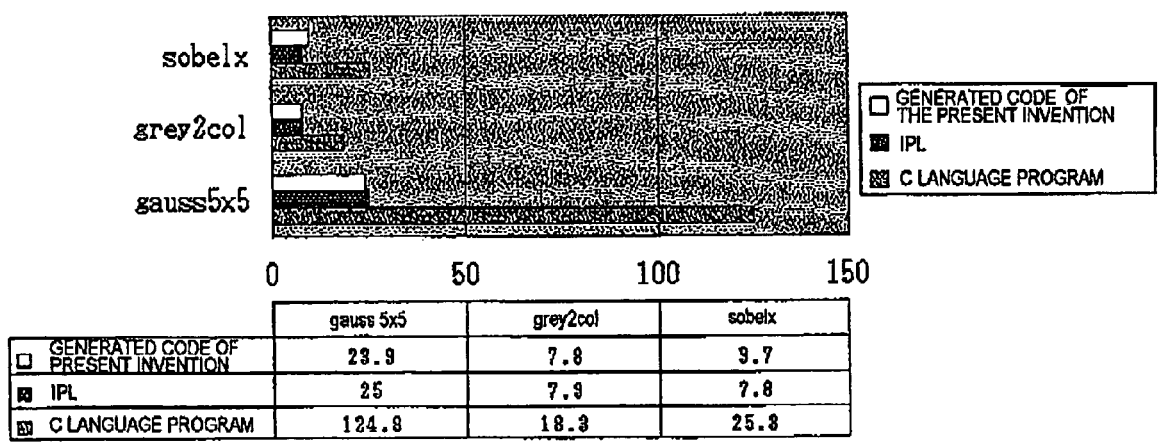
FIG. 12 illustrates the advantages of the preferred embodiment of the present invention.

One of the Intel's Pentium® processor series is used as a target machine with the line-by-line operation designation for image processing input thereto. FIG. 12 shows the result of comparison of processing time of the machine code containing the SIMD instruction sequence generated in accordance with the technique of the present invention with a predetermined routine in a known image processing library (IPL) provided by Intel Corporation in which a manually generated assembly designation in an identical process is efficiently incorporated. FIG. 12 shows that the SIMD instruction sequence generated using the technique of the present invention out performs the manually generated assembly designation.

The main reason for this is that the combination of the input in the line-by-line operation designation form and the compile means of the present invention allows a high-speed SIMD instruction sequence to be generated.

One reason why the high-speed SIMD instruction sequence is generated is described below. The SIMD instruction is typically unable to efficiently process in parallel a series of data elements if the series of data elements are not present in consecutive addresses with the head address thereof aligned to the powers of 2. The line-by-line operation designation for designating a series of data elements corresponding to one line of image always designates the process of the line data having the address aligned to the powers of 2. The compiler 2 thus easily converts the operation responsive to the line-by-line operation designation to an SIMD instruction sequence on the standard rule, thereby generating a high-speed target code.

Figure 13:
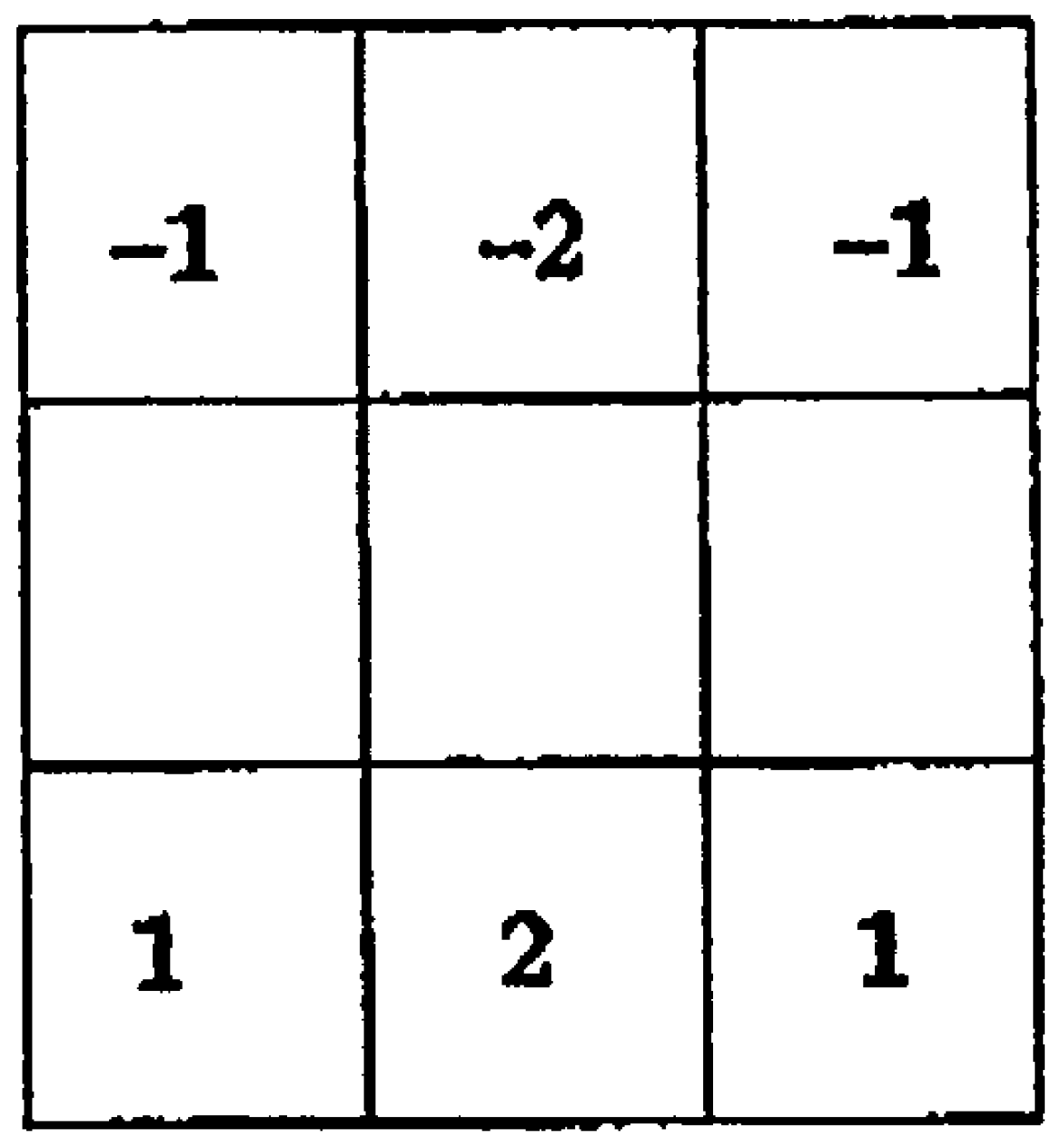

Another reason why the high-speed SIMD instruction sequence is generated is described below. The use of the symmetry of filter kernel coefficients of a filtering process often used in image processing allows an SIMD instruction to result in the same throughput with a smaller amount of computation. For example, the kernel coefficients of the image filtering process designated by the "line-by-line operation designation" of FIG. 2 are vertically symmetrical as shown in FIG. 13. The line-by-line adjacent element reference designation at line 16 of FIG. 2, which utilizes the vertical symmetry, designates an operation to determine data based on the result of calculation of the left-side data element and the result of calculation of the right-side data element. In response to the line-by-line adjacent reference designation, the compiler 2 generates a target code having a loop structure including a series of SIMD read instructions and a series of SIMD write instructions, as the SIMD instruction sequence designation shown in FIG. 10. The designated operation is efficiently performed. The compiler 2 thus generates a high-speed SIMD instruction sequence accounting for the kernel coefficients of the image filtering process.

In this way, the present invention provides the method and the apparatus for generating the SIMD instruction sequence for efficient image processing from the image processing designation based on the high-level language.

While this invention has thus far been described in conjunction with a few embodiments thereof, it will be readily possible for those skilled in the art to put the this invention into various other manners.

What is claimed is:

1. An SIMD instruction sequence generation method executed by a computer, the SIMD instruction sequence generation method comprising:

generating automatically an SIMD instruction sequence from a source code that is described using a line-by-line process designation, wherein the line-by-line process designation is a combination of a line-by-line calculation designation and a line-by-line adjacent element reference designation, the line-by-line calculation designation designating one of the same unary operation to be performed to all data elements of the line data, and the same binary operation to be performed to all corresponding data element pairs of line data of two lines, and the line-by-line adjacent element reference designation designating an operation for referencing a data element which is separated to the right or to the left by a designated number of elements from each of all data elements of the line data; and outputting the line data processed based on the SIMD instruction sequence.

2. The SIMD instruction sequence generation method according to claim 1, wherein the line data is line data of an image, and outputting the processed line data further includes outputting the image processed based on the SIMD instruction sequence.

3. An SIMD instruction sequence generation method executed by a computer, the SIMD instruction sequence generation method comprising:

generating automatically an SIMD instruction sequence from a source code that is described using a line-by-line operation designation, wherein the line-by-line operation designation is a combination of a line-by-line process designation, a line data extraction designation for referencing a particular data element of the line data, a broadcast designation for substituting scalar data as particular single data for all data elements of the line data, and a scalar process designation for designating a process to scalar data; and outputting the line data processed based on the SIMD instruction sequence.

4. The SIMD instruction sequence generation method according to claim 3, wherein the line data is line data of an image, and outputting the processed line data further includes outputting the image processed based on the SIMD instruction sequence.

5. An SIMD instruction sequence generation method executed by a computer, the SIMD instruction sequence generation method comprising:

a translation step for inputting a source code to a first storage device, parsing and optimizing the source code, generating an SIMD macro code that is an intermediate form taking into consideration of the use of an SIMD instruction set, and outputting the SIMD macro code to a second storage device, wherein the source code is described using a line-by-line process designation, and a line-by-line operation designation, the line-by-line process designation being a combination of a line-by-line calculation designation and a line-by-line adjacent element reference designation, the line-by-line calculation designation designating one of the same unary operation to be performed to all data elements of the line data, and the same binary operation to be performed to all corresponding data element pairs of line data of two lines, the line-by-line adjacent element reference designation designating an operation for referencing a data element which is separated to the right or to the left by a designated number of elements from each of all data elements of the line data, and the line-by-line operation designation being a combination of a line data extraction designation for referencing a particular data element of the line data, a broadcast designation for substituting scalar data as particular single data for all data elements of the line data, and a scalar process designation for designating a process to scalar data;

a simplification step for generating a simplified SIMD macro code and outputting the simplified SIMD macro code to a third storage device, wherein the simplified SIMD macro code is generated by receiving the SIMD macro code from the second storage device, analyzing the relationship between a definition and a reference of a virtual SIMD register for an entire code having the virtual SIMD register in an operand, and converting the SIMD macro code into a composite macro code having a series of codes having the relationship between the definition and the reference to the same virtual SIMD register based on the analysis result;

a machine code generation step for receiving the simplified SIMD macro code from the third storage device, for generating an instruction sequence for performing an operation as designated in response to the scalar process designation contained in the line-by-line operation designation, and for generating, in response to the line-by-line process designation, an SIMD instruction sequence for designating a loop operation, wherein the loop operation is repeated by P/(S×M) cycles, and comprises, in the body thereof, M SIMD load instructions for loading, in M SIMD registers, S×M data elements (S is a value smaller than P and is the number of data elements that are simultaneously processed in response to a single SIMD instruction and M is an integer equal to or larger than 1 and equal to or smaller than the number of SIMD registers held by a target machine) from among P data elements of the line date to be processed (P is the number of pixels horizontally across an image to be processed) present in consecutive addresses in a memory with a head address aligned to the powers of 2, SIMD operation instructions of the number required for the M SIMD registers, and M SIMD write instructions for writing, in a memory area having consecutive addresses with the head address thereof aligned to the powers of 2, the content of the M SIMD registers having data obtained as a result of the SIMD operation instructions; and an output step for outputting the image processed based on the SIMD instruction sequence.

6. The SIMD instruction sequence generation method according to claim 5, wherein the line data is line data of the image, and the output step further includes outputting the image processed based on the SIMD instruction sequence.

7. The SIMD instruction sequence generation method according to claim 6, wherein the output step further includes storing the image processed based on the SIMD instruction sequence on a computer-readable medium.

8. A computer implementing an SIMD instruction sequence generator comprising:
- a first storage device for receiving and storing a source code, wherein the source code is described using a line-by-line process designation, and a line-by-line operation designation, the line-by-line process designation being a combination of a line-by-line calculation designation and a line-by-line adjacent element reference designation, the line-by-line calculation designation designating one of the same unary operation to be performed to all data elements of the line data, and the same binary operation to be performed to all corresponding data element pairs of line data of two lines, the line-by-line adjacent element reference designation designating an operation for referencing a data element which is separated to the right or to the left by a designated number of elements from each of all data elements of the line data, and the line-by-line operation designation being a combination of a line data extraction designation for referencing a particular data element of the line data, a broadcast designation for substituting scalar data as particular single data for all data elements of the line data, and a scalar process designation for designating a process to scalar data;
- translation means for receiving the source code from a first storage device, parsing and then optimizing the source code, and generating an SIMD macro code that is an intermediate form taking into consideration the use of an SIMD instruction set;
- a second storage device for receiving and storing the SIMD macro code generated by the translation means;
- simplifying means for generating a simplified SIMD macro code, wherein the simplified SIMD macro code is generated by receiving the SIMD macro code from the second storage device, analyzing the relationship between a definition and a reference of a virtual SIMD register for an entire code having the virtual SIMD register in an operand, and converting the SIMD macro code into a composite macro code having a series of codes having the relationship between the definition and the reference to the same virtual SIMD register based on the analysis result;
- a third storage device for receiving and storing the simplified SIMD macro code generated by the simplifying means;
- machine code generating means for receiving the simplified SIMD macro code from the third storage device, for generating an instruction sequence for performing an operation as designated in response to the scalar process designation contained in the line-by-line calculation designation, and for generating, in response to the line-by-line process designation, an SIMD instruction sequence for designating a loop operation, wherein the loop operation is repeated by $P/(S\times M)$ cycles, and comprises, in the body thereof, M SIMD load instructions for loading, in M SIMD registers, $S\times M$ data elements (S is a value smaller than P and is the number of data elements that are simultaneously processed in response to a single SIMD instruction and M is an integer equal to or larger than 1 and equal to or smaller than the number of SIMD registers held by a target machine) from among P data elements of the line date to be processed (P is the number of pixels horizontally across an image to be processed) present in consecutive addresses in a memory with a head address aligned to the powers of 2, SIMD operation instructions of the number required for the M SIMD registers, and M SIMD write instructions for writing, in a memory area having consecutive addresses with the head address there of aligned to the powers of 2, the content of the M SIMD registers having data obtained as a result of the SIMD operation instructions; and
- a fourth storage device for receiving and storing a machine code which is an instruction sequence generated by the machine code generating means.

9. The computer according to claim 8, wherein the line data is line data of the image, and the computer further comprises an output means for outputting the image processed based on the SIMD instruction sequence to a computer-readable medium.

10. A computer implementing a computer program for causing a computer to function as an SIMD instruction sequence generator comprising:
- translation means for inputting a source code from a first storage device which stores the source code, parsing and then optimizing the source code, generating an SIMD macro code that is an intermediate form taking into consideration the use of an SIMD instruction set, and outputting the SIMD macro code to a second storage device for storing the SIMD macro code, wherein the source code is described using a line-by-line process designation, and a line-by-line operation designation, the line-by-line process designation being a combination of a line-by-line calculation designation and a line-by-line adjacent element reference designation, the line-by-line calculation designation designating one of the same unary operation to be performed to all data elements of the line data, and the same binary operation to be performed to all corresponding data element pairs of line data of two lines, the line-by-line adjacent element reference designation designating an operation for referencing a data element which is separated to the right or to the left by a designated number of elements from each of all data elements of the line data, and the line-by-line operation designation being a combination of a line data extraction designation for referencing a particular data element of the line data, a broadcast designation for substituting scalar data as particular single data for all data elements of the line data, and a scalar process designation for designating a process to scalar data;
- simplifying means for generating a simplified SIMD macro code, wherein the simplified SIMD macro code is generated by receiving the SIMD macro code from the second storage device, analyzing the relationship between a definition and a reference of a virtual SIMD register for an entire code having the virtual SIMD register in an operand, converting the SIMD macro code into a composite macro code having a series of codes having the relationship between the definition and the reference to the same virtual SIMD register based on the analysis result, and outputting the simplified SIMD macro code to a third storage device for storing the simplified SIMD macro code; and
- machine code generating means for receiving the simplified SIMD macro code from the third storage device, for generating an instruction sequence for performing an operation as designated in response to the scalar process designation contained in the line-by-line calculation designation, and for generating, in response to the line-by-line process designation, an SIMD instruction sequence for designating a loop operation, wherein the loop operation is repeated by $P/(S\times M)$ cycles, and comprises, in the body thereof, M SIMD load instructions for loading, in M SIMD registers, $S\times M$ data elements (S is a value smaller than P and is the number of data elements that are simultaneously processed in response to a single SIMD instruction and M is an integer equal to or larger than 1 and equal to or smaller than the number of SIMD registers held by a target machine) from among P data elements of the line date to be processed (P is the number of pixels horizontally across an image to be processed) present in consecutive addresses in a memory with a head address aligned to the powers of 2, SIMD operation instructions of the number required for the M SIMD registers, and M SIMD write instructions for writing, in a memory area having consecutive addresses with the head address there of aligned to the powers of 2, the content of the M SIMD registers having data obtained as a result of the SIMD operation instructions.

11. The computer according to claim 10, wherein the line data is line data of the image, and the computer further comprises an output means for outputting the image processed based on the SIMD instruction sequence to a computer-readable medium.

12. An SIMD instruction sequence generation method executed by a computer, the SIMD instruction sequence generation method comprising:

generating automatically an SIMD instruction sequence from a source code that is described using a process designation that is to be performed on line data of an image on a line by line basis;

generating an instruction sequence for performing an operation as designated in response to a scalar process designation contained in a line-by-line operation designation, and generating, in response to a line-by-line process designation, the SIMD instruction sequence for designating a loop operation, wherein the loop operation is repeated by P/(S×M) cycles, and comprises, in the body thereof, M SIMD load instructions for loading, in M SIMD registers, S×M data elements (S is a value smaller than P and is the number of data elements that are simultaneously processed in response to a single SIMD instruction and M is an integer equal to or larger than 1 and equal to or smaller than the number of SIMD registers held by a target machine) from among P data elements of the line date to be processed (P is the number of pixels horizontally across an image to be processed) present in consecutive addresses in a memory with a head address aligned to the powers of 2, SIMD operation instructions of the number required for the M SIMD registers, and M SIMD write instructions for writing, in a memory area having consecutive addresses with the head address thereof aligned to the powers of 2, the content of the M SIMD registers having data obtained as a result of the SIMD operation instructions; and outputting the image processed based on the SIMD instruction sequence.

13. An SIMD instruction sequence generation method executed by a computer, the SIMD instruction sequence generation method comprising:

generating automatically an SIMD instruction sequence from a source code that is described using a line-by-line process designation, wherein the line-by-line process designation is a combination of a line-by-line calculation designation and a line-by-line adjacent element reference designation, the line-by-line calculation designation designating one of the same unary operation to be performed to all data elements of the line data, and the same binary operation to be performed to all corresponding data element pairs of line data of two lines, and the line-by-line adjacent element reference designation designating an operation for referencing a data element which is separated to the right or to the left by a designated number of elements from each of all data elements of the line data;

generating an instruction sequence for performing an operation as designated in response to a scalar process designation contained in a line-by-line operation designation, and generating, in response to the line-by-line process designation, the SIMD instruction sequence for designating a loop operation, wherein the loop operation is repeated by P/(S×M) cycles, and comprises, in the body thereof, M SIMD load instructions for loading, in M SIMD registers, S×M data elements (S is a value smaller than P and is the number of data elements that are simultaneously processed in response to a single SIMD instruction and M is an integer equal to or larger than 1 and equal to or smaller than the number of SIMD registers held by a target machine) from among P data elements of the line date to be processed (P is the number of pixels horizontally across an image to be processed) present in consecutive addresses in a memory with a head address aligned to the powers of 2, SIMD operation instructions of the number required for the M SIMD registers, and M SIMD write instructions for writing, in a memory area having consecutive addresses with the head address thereof aligned to the powers of 2, the content of the M SIMD registers having data obtained as a result of the SIMD operation instructions; and outputting the image processed based on the SIMD instruction sequence.

14. An SIMD instruction sequence generation method executed by a computer, the SIMD instruction sequence generation method comprising:

generating automatically an SIMD instruction sequence from a source code that is described using a line-by-line operation designation, wherein the line-by-line operation designation is a combination of a line-by-line process designation, a line data extraction designation for referencing a particular data element of the line data of an image, a broadcast designation for substituting scalar data as particular single data for all data elements of the line data, and a scalar process designation for designating a process to scalar data;

generating an instruction sequence for performing an operation as designated in response to the scalar process designation contained in the line-by-line operation designation, and generating, in response to the line-by-line process designation, the SIMD instruction sequence for designating a loop operation, wherein the loop operation is repeated by P/(S×M) cycles, and comprises, in the body thereof, M SIMD load instructions for loading, in M SIMD registers, S×M data elements (S is a value smaller than P and is the number of data elements that are simultaneously processed in response to a single SIMD instruction and M is an integer equal to or larger than 1 and equal to or smaller than the number of SIMD registers held by a target machine) from among P data elements of the line date to be processed (P is the number of pixels horizontally across an image to be processed) present in consecutive addresses in a memory with a head address aligned to the powers of 2, SIMD operation instructions of the number required for the M SIMD registers, and M SIMD write instructions for writing, in a memory area having consecutive addresses with the head address thereof aligned to the powers of 2, the content of the M SIMD registers having data obtained as a result of the SIMD operation instructions; and outputting the image processed based on the SIMD instruction sequence.

* * * * *